United States Patent [19]

Oren et al.

[11] Patent Number: 5,630,117
[45] Date of Patent: *May 13, 1997

[54] USER INTERFACE SYSTEM AND METHOD FOR TRAVERSING A DATABASE

[75] Inventors: Timothy R. Oren, Sunnyvale; Kristee M. Kreitman, Atherton; Gitta B. Salomon, Palo Alto, all of Calif.

[73] Assignee: Apple Computer, Inc., Cupertino, Calif.

[*] Notice: The portion of the term of this patent subsequent to Jun. 18, 2012, has been disclaimed.

[21] Appl. No.: 404,187

[22] Filed: Mar. 13, 1995

Related U.S. Application Data

[63] Continuation of Ser. No. 900,538, Jun. 18, 1992, Pat. No. 5,408,655, which is a continuation of Ser. No. 316,331, Feb. 27, 1989, abandoned.

[51] Int. Cl.$^6$ ................................................ G06F 17/30
[52] U.S. Cl. ........................... 395/602; 364/DIG. 1; 364/282.1; 395/611; 395/603
[58] Field of Search ................ 364/DIG. 1, DIG. 2; 395/600, 159

[56] References Cited

U.S. PATENT DOCUMENTS

| | | | |
|---|---|---|---|
| 4,653,021 | 3/1987 | Takagi | 364/900 |
| 4,805,099 | 2/1989 | Huber | 364/300 |
| 4,807,122 | 2/1989 | Baba | 364/200 |
| 4,817,036 | 3/1989 | Millett et al. | 364/900 |
| 4,839,853 | 6/1989 | Deerwester et al. | 364/900 |
| 4,870,568 | 9/1989 | Kahle et al. | 364/200 |
| 4,905,163 | 2/1990 | Garber et al. | 364/513 |
| 4,914,586 | 4/1990 | Swinehart et al. | 364/200 |
| 4,965,763 | 10/1990 | Zamora | 364/900 |
| 5,047,918 | 9/1991 | Schwartz et al. | 364/200 |
| 5,206,949 | 4/1993 | Cochran et al. | 395/600 |
| 5,220,657 | 6/1993 | Bly et al. | 395/425 |
| 5,233,687 | 8/1993 | Henderson, Jr. et al. | 395/158 |

OTHER PUBLICATIONS

*Hypertext: An Introduction and Survey*, Jeff Conklin, Micro-Electronics and Computer Technology Corp., Sep. 1987.

(List continued on next page.)

*Primary Examiner*—Thomas G. Black
*Assistant Examiner*—Maria N. Von Buhr
*Attorney, Agent, or Firm*—Blakely, Sokoloff, Taylor & Zafman

[57] ABSTRACT

A user interface system and method for traversing a database. In one aspect the present invention includes providing a plurality of command options, each of the command options represented by a set of descriptive option index terms characterizing that command option. The set of descriptive option index terms characterizing the command options selected by a user are compared with sets of document index terms. Each set of document index terms being compared characterizes an electronic document in a hypertext-type database which is selectively linked in that database with the user's present position. The comparisons result in a ranked list of the selectively linked electronic documents. The electronic documents are ranked in accordance with the relevancy of each document with respect to the selected command option. In another aspect of the invention, a plurality of command options are generated and displayed on a computer controlled display system (CCDS), each command option being represented by a portrayed character or personality associable to the user as being biased toward a particular type of information. Each of the command options represent a set of option index terms which characterize that particular command option. The set of option index terms characterizing the command option presently selected are compared with sets of document index terms. Each set of document index terms characterize an electronic document located within the database. The comparisons result in a ranked list of electronic documents, the documents being ranked in accordance with the particular bias of the portrayed character or personality.

15 Claims, 9 Drawing Sheets

OTHER PUBLICATIONS

*An Evaluation of Retrieval Effectiveness for a Full-Text Document-Retrieval System*, David C. Blair et al, Communications of the ACM, Mar. 1985.

*Computer*, Jan. 1988, Intermedia: The Concept and the Construction of a Seamless Information Environment.

*Superbook: An Automatic Tool for Information Exploration—Hypertext?*, Joel R. Remde et al., Bell Communications Research, Nov. 1987.

*Searching for Information in a Hypertext Medical Handbook*, Mark E. Frisse, Communications of the ACM, vol. 31, No. 7, Jul. 1988.

SYSTEM DIAGRAM

USER INTERFACE SYSTEM AND METHOD FOR TRAVERSING A DATABASE

This is a continuation of application Ser. No. 07/900,538, filed Jun. 18, 1992, now U.S. Pat. No. 5,408,655 which is a continuation of application Ser. No. 07/316,331, filed Feb. 27, 1989, now abandoned.

BACKGROUND OF THE INVENTION

1. Field of the Invention

The present invention relates to user interfaces for data storage and retrieval systems and more particularly to a system and method for choosing and executing queries to such data storage and retrieval systems and traversing databases associated therewith.

2. Description of Related Art

Many current data storage and retrieval systems are organized using a principle commonly identified as "hypertext". Hypertext has resulted as computer work stations and digital storage have grown cheaper, more powerful and more available. It has become increasingly more attractive to extend the traditional notion of "flat" text files organized hierarchically by allowing more complex nonlinear organizations of material. In a hypertext system, each data entity, i.e. document or node, may be directly connected to other documents in the system by pointers, or links. The human user of a hypertext system moves between (browses) documents by following these links.

An essential characteristic of a hypertext database system is a machine supported ability to efficiently traverse via these links from node to node. In this regard, as noted in the article entitled "Hypertext: An Introduction and Survey" by J. Conklin, COMPUTER, September 1987, pages 17-41, to qualify as hypertext, a system should require no more than a couple of keystrokes (or mouse movements) from the user to follow a single link. The links provided by the interface transport the user quickly and easily to a new place in the hypertext system. Another characteristic of a hypertext system is the speed with which the system responds to referencing requests. Only brief delays typically occur (one or two seconds at most).

Although hypertext systems presently provide the ability for the user to traverse efficiently between nodes via links once he or she determines the desired links to be utilized, the number of documents in a hypertext system may be very large. Consequently, the number of links connected to any document may also become very large. This leads to difficulties in "navigating" through the database, the large number of links from each document often resulting in confusion by the user when attempting to select which link to follow.

One attempt to overcome this problem is by providing an overview display or "map" of the hypertext documents and links. This technique has the disadvantage of creating a large and complex map display when the number of documents and links is large. There is a resultant .need for further control and display options which the user must learn, and in the expenditure of the user's time in manipulating the map, rather than more effective use of his time, such as reading documents.

Another solution to this navigational dilemma is to apply standard database search and query techniques for locating documents which the user is seeking. This involves addressing entities by content; that is, by text or numbers stored, in addition to or rather than a user-assigned name or symbol. This is usually executed by applying some combination, using boolean operations of key word and full string search and predicates on other attributes (such as author, time of creation, type, etc.) of nodes or links. Various standard and proprietary languages exist for querying structured databases or text retrieval systems (for example, DIALOG, SQL). All of these languages share the drawback of being arbitrary and complex, which poses a problem in applications where untrained users must query a data storage system, or in educational and training uses where presuming prior user training in the query method is inappropriate.

Experience with textual query methods has also shown that they are subject to tradeoffs between precision (the number of retrieved entities which are actually interesting) and recall (the fraction of total interesting entities which are actually found). Such studies have found that, for instance, a typical query to a legal information system produces only 20% of those database entires which are actually relevant. (See the article entitled "Art Evaluation of Retrieval Effectiveness for a Full Text Document Retrieval System", by D. C. Blair and M. E. Maron, COMMUNICATIONS OF THE ACM, March 1985, Vol. 28, No. 3, Pgs. 289-299.)

Other attempts to control the complexity of linking have concentrated on database-wide elision of sets of links. For instance, the Intermedia system allows the separation of links into sets called webs. Only one of these sets is visible to the user at a time. This achieves simplication but at the expense of possibly removing valuable links from consideration if those links are stored in the webs which are not loaded. (See the article entitled "Intermedia: The Concept and the Construction of a Seamless Information Environment", by N. Yankelovich, et.al., COMPUTER, January 1988, pgs. 81-96.)

Another approach to elision is filtering, that is, database-wide selection of documents and links based on a query, in a fashion similar to that described above. In some systems (e.g. see the article entitled "Super Book: An automatic tool for information exploration—hypertext?", by J. R. Remde, et.al., Bell Communications Research, HYPERTEXT '87 PAPERS, November 1987, pgs. 175-188; and the article entitled "Searching for Information in a Hypertext Medical Handbook", COMMUNICATIONS OF THE ACM, July 1988, pgs. 880-886), the pattern of links is also considered in the decision to remove entities from the user's view. However, because such filtering methods treat the entire database at once, they share the limit of precision—recall tradeoff as described above, meaning that they achieve reduction of complexity at the expense of loss of information.

With the growing use of multimedia databases containing not only textual documents, but also data entities containing sound and graphics, and the growing utilization of hypertext-type nodal networks within these multimedia databases, the requirement for effective and meaningful navigation has become even more imperative.

Utilization of a hypertext-type nodal network in conjunction with a multimedia database may be described as a "hypermedia database". Thus, as defined broadly herein, the term "hypermedia system" refers to a database which may be constructed to include documents or nodes and machine supported selected linkages or pointers which provide the user with the ability to efficiently travel from one node to another. These nodes may include text, sound, or graphic material. An example of a system that supports hypermedia is Apple Computer Inc.'s system sold under the trademark "HYPERCARD" which allows traversal through a hypertext-type nodal network containing text, sound and graphics. HYPERCARD provides the machine supported ability to selectively traverse in an automatic fashion via linkages, from one item to another, the items being selectively linked to each other in the nodal network.

In attempting to develop improved techniques for browsing through mature HYPERCARD databases, the present inventors have discovered the novel system and method of the present invention. As will be disclosed below, an aspect of the present invention involves a process for selecting, ordering and displaying a subset of the possible links from a document, resulting in reduced user confusion while browsing through a hypermedia system. Another aspect of the inventive technique involves the use of an intuitive representation to the user of options or "guides", the selection thereof effectively masking a complex indexing and query method.

SUMMARY OF THE INVENTION

A user interface system and method for traversing a database. In one aspect the present invention includes providing a plurality of command options, each of the command options represented by a set of descriptive option index terms characterizing that command option. Means are provided for comparing the set of option index terms of the command options selected by the user with sets of document index terms. Each set of document index terms being compared characterizes an electronic document in a hypertext-type database which is selectively linked in that database with the user's present position. The term "hypertext-type database", as used herein, may refer to either a hypertext database or a hypermedia database. The comparisons result in a ranked list of the selectively linked electronic documents. The electronic documents are ranked in accordance with the relevancy of each document with respect to the selected command option. The user is therefore enabled to efficiently retrieve relevant documents in accordance with his selected command option.

In another aspect of the present invention, a plurality of command options are generated and displayed on a CCDS, each command option being represented by a portrayed character or personality associable to the user as being biased toward a particular type of information. Each of the command options represent a set of option index terms which characterize that particular command option. Means are provided for comparing the set of option index terms characterizing the command option presently selected with sets of document index terms. Each set of document index terms characterize an electronic document located within the database. The comparisons result in a ranked list of electronic documents, the documents being ranked in accordance with the particular bias of the portrayed character or personality.

In a hypertext-type database the use of such portrayed character is particularly useful, the portrayed character effectively serving as a "guide" to the user, the guide providing an efficient mechanism for browsing the database.

The automatic formulation of a ranked list of electronic documents may be produced by assigning a match value to each electronic document being compared with the selected option.

BRIEF DESCRIPTION OF THE DRAWINGS

FIGS. 5a–5f are screen displays of a reduction to practice of the present invention.

FIG. 5a shows a screen display illustrating the choices of guides or options available for traversing the subject hypermedia database.

FIG. 5b illustrates a screen display with a window showing the particular selected guide's option index terms and first choice of article.

FIG. 5c illustrates a screen display of the selected electronic document.

FIG. 5d is a screen display with a window showing a ranked list of preferred documents.

FIG. 5e is a screen display with a window illustrating the correspondence between the presently selected document index terms and the index terms characterizing the selected option.

FIG. 5f is a screen display with two windows, the top window showing the correspondence between the document index terms of another document on the ranked list of documents and the option index terms characterizing the selected guide.

The same elements or parts throughout the figures of the drawings are designated by the same reference characters, while equivalent elements bear a prime designation.

DETAILED DESCRIPTION OF THE PREFERRED EMBODIMENTS

The following detailed description is divided into several sections. The first of these discloses a general system arrangement for storing, retrieving, and manipulating data. Subsequent sections deal with the traversal system including construction of the database, specification of the criteria set, user start-up, traversing the database, and the use of a guide in the user interface. Additionally, an example of an implementation of this system is provided.

I. General System Configuration

Figure 1:
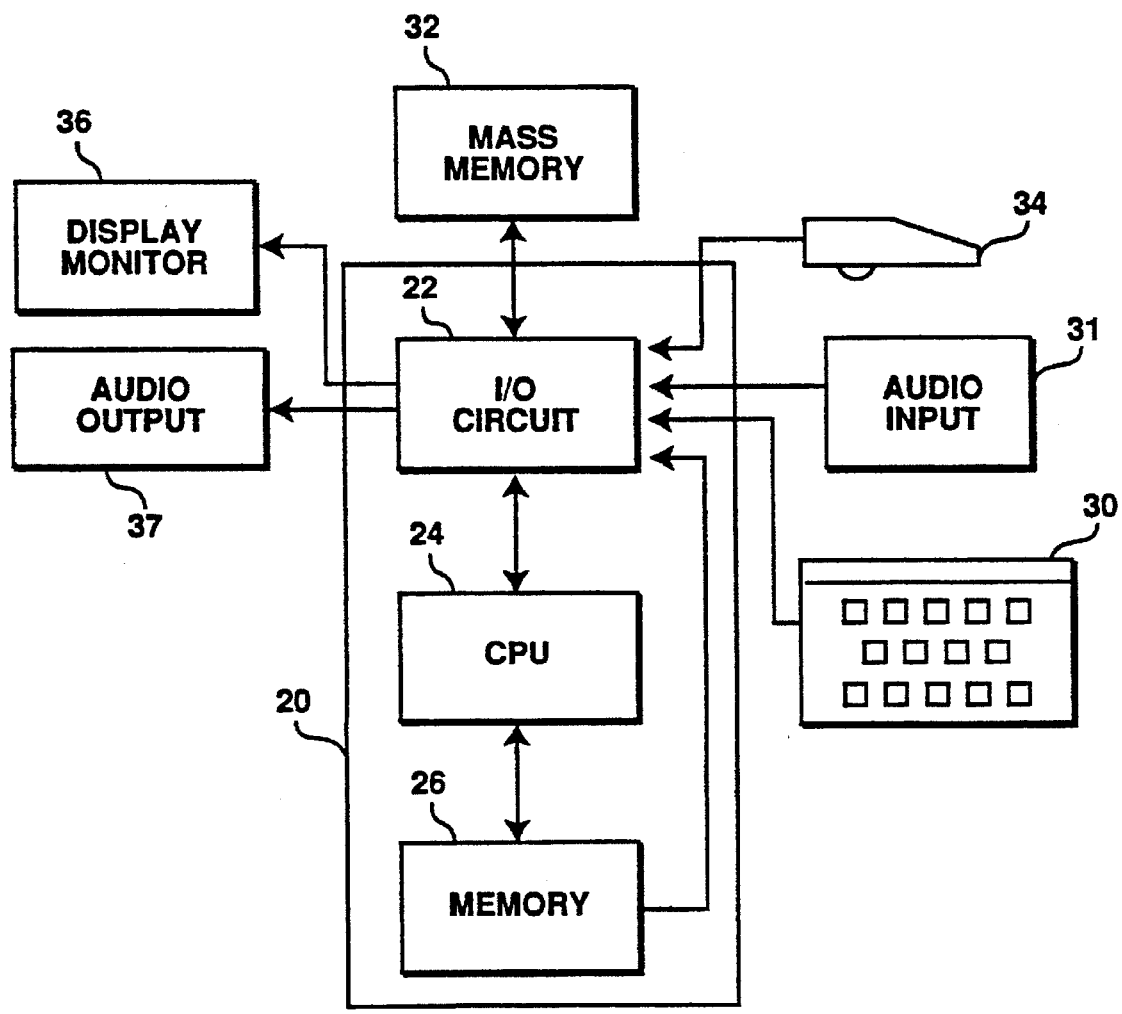
FIG. 1 illustrates the computer incorporating the present invention.

FIG. 1 illustrates a typical computer controlled display system (CCDS) implementing the present invention. Shown there is a computer 20 which comprises three major components. The first of these is the input/output (I/O) circuit 22 which is used to communicate information in appropriately structured form to and from the other parts of computer 20. Also shown as part of computer 20 is the central processing unit (CPU) 24 and memory 26. These latter two elements are those typically found in most general purpose computers and almost all special purpose computers. In fact, the several elements contained within computer 20 are intended to be representative of this broad category of data processors. Particular examples of suitable data processors to fill the role of computer 20 include machines manufactured by Apple Computer, Inc., and International Business Machines (IBM). Other computers having like capabilities may be adapted in a straight forward manner to perform the several functions described below.

Also shown in FIG. 1 is an input device 30 shown in a typical embodiment as a keyboard. It should be understood, however, that the input device may actually be a card reader, magnetic or paper tape reader, or other well known input device (including, of course, another computer). Also shown is an audio input device 31 which converts analog audio information to digital information. The audio signal may be supplied by a microphone or other conventional audio source such as compact disc, cassette, etc. A mass memory device 32 coupled to the I/O circuit 22 provides additional storage capability for the computer 20. The mass memory 32 may include other programs and the like and may take the form of a magnetic or paper tape reader, hard disk drive, compact laser disk, or other well known mass storage device. It will be appreciated that the data retained within mass memory 32, may in appropriate cases, be incorporated in standard fashion into computer 20 as part of the memory 26.

In addition, a "mouse" input device 34 is illustrated which permits the user to input graphic information to computer 20 through I/O circuit 22, in a well known manner. Generally, mouse 34 provides cursor control to identify and position a cursor on a display screen. A computer controlled display monitor 36 is illustrated which is used to display the images being generated by the present invention. Such a display monitor 36 may take the form of a cathode ray tube (CRT), liquid crystal panel (LCD), or other well known display devices.

An audio output analog signal converts digital information to analog audio signals. The audio output is represented by numeral designation 37. The analog output may be delivered to headphones, loudspeaker, or other well known audio mixing and storage devices such as magnetic tape.

In the present invention, memory 26 includes a "bit map" which represents the video memory for display monitor 36. Each bit (or groups of bits) in the bit map 40 within memory 26 corresponds to a display element on display monitor 36. Thus, the bit map can be described by a two dimensional array of points having known X, Y coordinates. The display elements comprising the display of display monitor 36 may be selectively enabled, or disabled, as a function of the bit map of memory 26 is "on" or "off". The use of bit maps to display images on a display monitor is well known, and will not be further described in detail in this Specification.

II. The Database Traversal System

Figure 2:
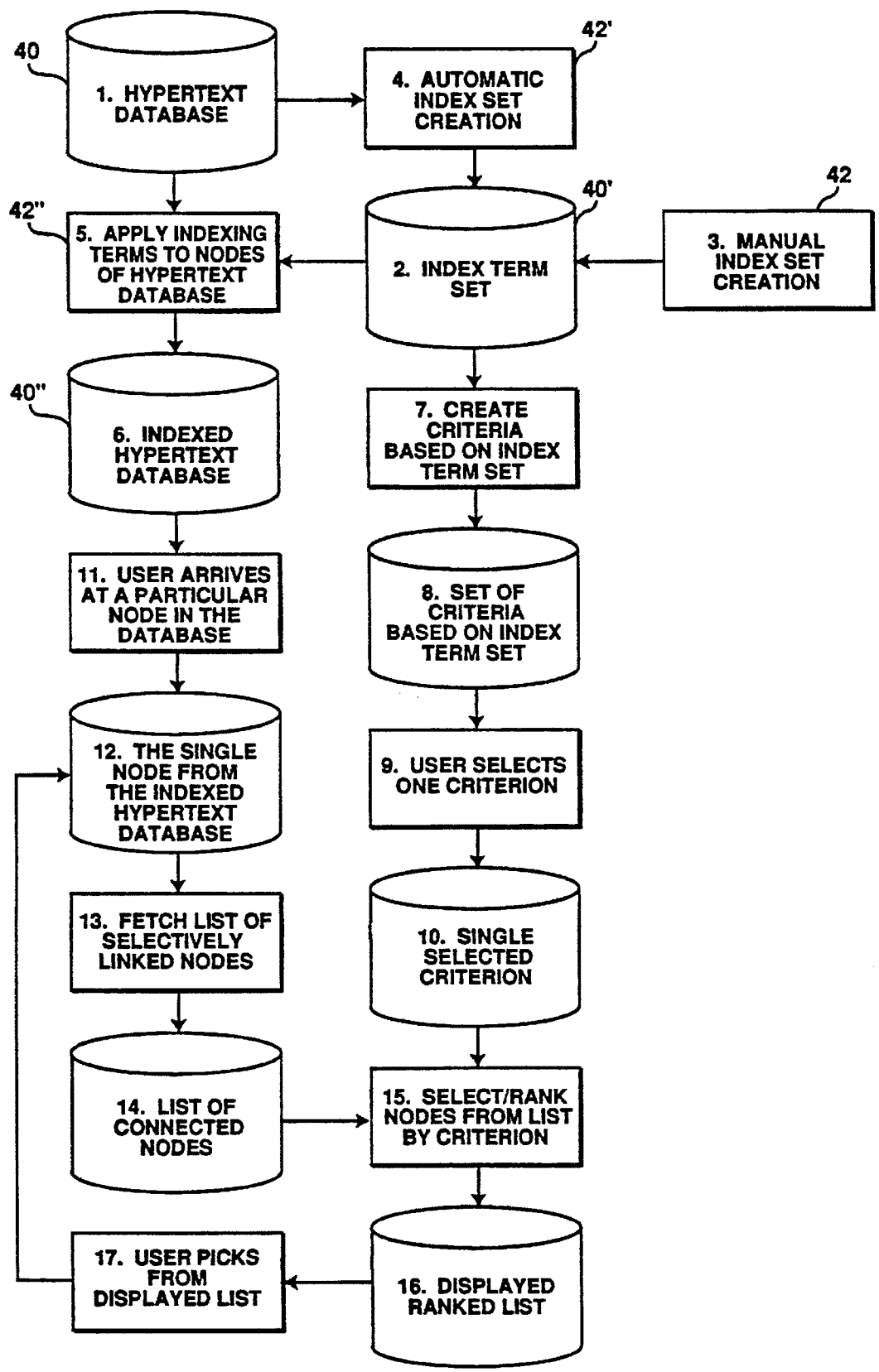
FIG. 2 is a system diagram of the logic associated with the operation of the database traversal system of the present invention.

FIG. 2 is a diagram illustrating the logic associated with the operation of the database traversal system. The system diagram includes a plurality of data stores, designated generally as 40,40',40" . . . which are shown to appear as three-dimensional depositories. The data stores represent collections of related data that can be stored in the computer mass memory or main memory. The system diagram also includes a plurality of process blocks, designated generally as 42, 42', 42" . . . , and shown to appear as rectangles. The process blocks 42 represent interactions between the user and the computer or interactions within the computer itself. It is assumed that the necessary program functions are provided by the aforementioned operating system to display characters and the like on the screen associated with the display device 36.

A. Construction of the Database

The first data store in the system diagram is labeled "Hypertext database". As noted, one aspect of the invention involves the utilization of any hypertext-type database. This may include hypermedia databases, which include graphics and sound. However, for ease in explanation, the system will be described in connection with a hypertext database. In view of the noted broader utility of the invention, it will be understood that this described application involving a hypertext database is purely illustrative and not limiting in nature.

Figure 3:
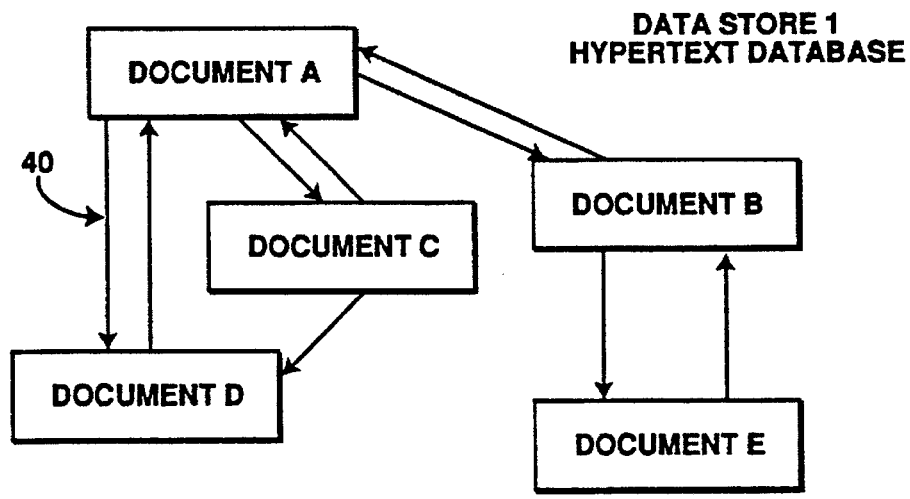
FIG. 3 is a schematic illustration of a simplified hypertext database.

Referring to FIG. 3, a simplified schematic of a hypertext database is illustrated, designated generally as 40. (The corresponding hypertext database is Data Store 1, also designated 40 in FIG. 2.) The database 40 may be located on a hard disk or optical disk in mass memory 32 or memory 26. Database 40 includes a plurality of hypertext nodes, designated Document A through Document E. The nodes may include text. (In a multimedia database each node might include, for example, graphics, a collection of sounds, or a combination thereof.) Although database 40 includes only five nodes, for simplified illustrative purposes, a typical hypertext database would include many more nodes. The nodes in the hypertext database 40 are linked by pointers or links, designated by the arrows in the figure. These links represent a machine supported capability of a user to traverse from one node to another, as indicated by the arrows, in an efficient manner. As noted in the Background of the Invention, transport should require no more than a couple of keystrokes (or mouse movements) and with only brief delays.

Links have two ends, and are usually considered to be directed, although it is common to support going "backwards" along the link. The origination of the link is called the "link source", and usually acts as a reference. The source can logically be either a single point or a region of text. The other end of the link, the "destination" of the link, usually functions as the reference, and can also be either a point or a region. A region source (or destination) is a set of contiguous characters which is displayed in some way as being a single unit.

In forming a useful indexed hypertext database, the documents of the database are tagged with descriptive terms or document index terms. The document index terms may be drawn from a pool of possible index terms. Data Store 2, containing these index terms (i.e. Index Term Set), is designated 40' in FIG. 2. This set might, for example, be stored in the mass storage 32 of the CCDS.

The Index Term Set may be formed manually (Process Block 3), or automatically (Process Block 4).

In manual indexing, a human generates a set of indexing terms based on knowledge of the database's subject area. This may be unordered, or it may be ordered in some fashion. A typical ordering is hierarchical, with more specific terms nested in an outline fashion below general terms.

In automatic indexing, a computer uses an algorithmic process to extract indexing terms from the nodes of the Hypertext database. A typical process, applied to text, is to extract every word from the document corresponding to the node, discard common or "stop" words and remove common suffixes. The entire residue list of unique words are then in the indexing set for the database.

Terms from Index Term Set may then be applied to each of the nodes in the hypertext database, by, for example, an automatic function of the CPU, in an algorithmic fashion or manually by the human editor. This process is represented as Process Block 5.

Figure 4:
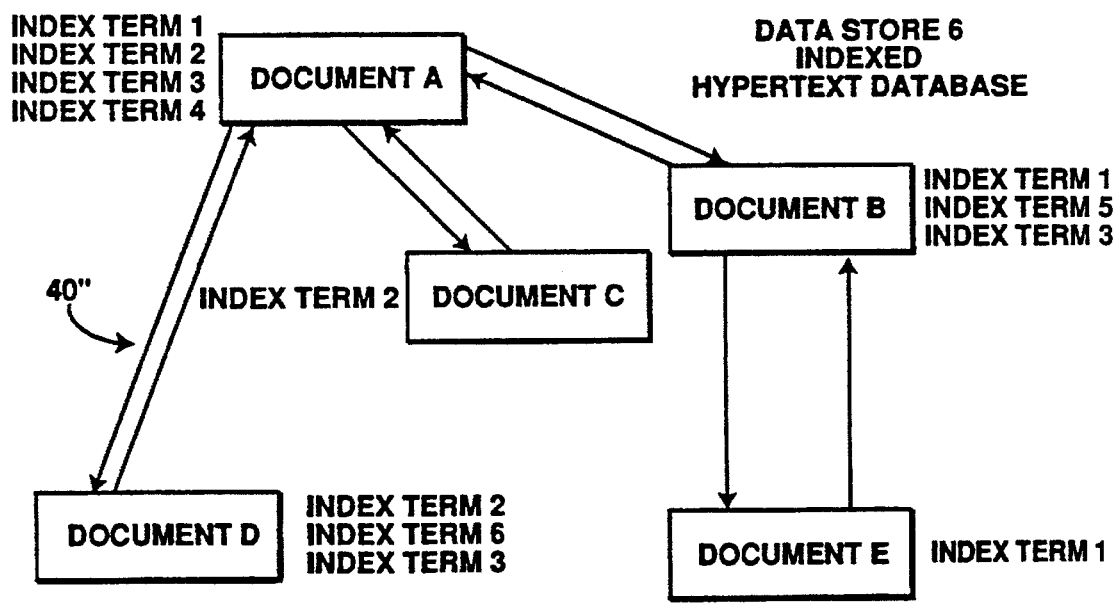
FIG. 4 is a schematic illustration of the hypertext database of FIG. 3 tagged with document index terms.

The resulting Indexed hypertext database (Data Store 6) is the same as that designated as Data Store 1; however, it includes document index terms. FIG. 4 illustrates this indexed hypertext database, generally designated 40". Thus, for example, as shown in FIG. 4, Document A might be tagged with Index Terms 1–4, Document B tagged with Index Terms 1, 5 and 3, etc.

B. Specification of the Criteria Set

Typically, from the set of indexing terms, one or more criteria or options are formulated manually, by the author of the database or by an end user. This procedure corresponds to Process Block 7 in FIG. 2. Traversal from one node of the hypertext link to a second node, using the system of the present invention, requires that at least one index term included in a selected criterion be from the subset of index terms contained in the indexed hypertext database (as explained below).

The formulation of a set of index terms as a criteria or "option" correlates to forming a query in a normal retrieval system. Relevant index terms for a particular criterion or option can be selected. Thus, for example, for one particular study, relevant index terms might be Index Term 4 and Index Term 5. For another study, for example, to study a different viewpoint, a different set of index terms would be included in another criterion corresponding to another option. A set of criteria or options based on index term sets is illustrated as Data Store 8.

Preferably, this aspect of the invention utilizes a portrayed character or personality to represent a complex set of index terms. In this respect, as will be described in detail below, this portrayed character serves as a type of "guide" for the user in browsing through the database, the guide representing a certain "viewpoint". As noted in the Background of the Invention, it is difficult to traverse through a mature hypertext database with a multiplicity of nodes and linkages. Applicants have discovered that confusion during the traversal of the database can be greatly eased by use of such a guide.

As used herein the term "option index term" refers to an index term included in the set of index terms representing an option. The term "document index term" refers to an index term included in the set of index terms representing a document.

C. User Traversal

Now that both:

(1) a set of criteria or options based upon a set of option index terms which contain (at least in part) a subset of the option terms in Data Store 8, and (2) an indexed hypertext database (e.g. Data Store 6) have been established, the system is set up to allow the user to traverse from one node to a second node in the database. The user selects a first command option from the CCDS, as denoted by Process Block 9. Data store 10 represents the selected option with selected option index terms tagged thereon.

The user, in browsing the indexed hypertext database, arrives at a particular node in the database (see Process Block 11). This particular node is represented by Data Store 12. The CPU computes the set of nodes connected to this particular node by hypertext links (Process Block 13). The set of these linked nodes is represented in Data Store 14. The document index terms characterizing the linked nodes are then compared with the option index terms characterizing the selected option. The comparison involves estimating the "relevance" of each linked node to the selected option and is preferably an automatic, algorithmic process. The desired result is the assignment of a "match value" to each linked document, the match value reflecting the correspondence between the document index terms characterizing that particular linked document with the option index terms characterizing the selected option.

A preferred method for assigning matched values to linked documents includes utilization of the following equation:

$$MV_d = (i_{od})^2 / i_o \times i_d \quad (1)$$

where, $MV_d$=the match value of a document, d;

$i_o$=the number of option index terms characterizing that particular option;

$i_d$=the number of document index terms characterizing the document for which a match value is being determined; and, $i_{od}$=the number of co-occurring index terms when comparing the document index terms of document d, for which a matched value is being determined and the option index terms characterizing that particular option.

Thus, by computation of a match value for each linked document, the linked documents may be ranked in accordance with their relevancy to the selected option. This ranked list of documents is represented by Data Store 16. Thus, each specific option has a one-to-one correspondence with a ranked list of documents.

For example, referring to FIG. 4, assume that the user is positioned at Document A. Also, assume that the user selects an option which is tagged with Index Terms 2 and 3. Therefore, matched values for each document can be computed as follows;

$$MV_B = (i_{oB})^2 / (i_o \times i_B) = 1^2/2 \times 3 = 1/6$$

$$MV_C = (i_{oC})^2 / (i_o \times i_C) = 1^2/2 \times 2 = 1/4$$

$$MV_D = (i_{oD})^2 / (i_o \times i_D) = 2^2/2 \times 3 = 2/3$$

Thus, the ranked list of linked documents sorted in accordance with the relevancy of each document with respect to the criterion set (i.e. option) comprising option index terms 2 and 3 is: D,C,B, in that order.

The above example is obviously a simplified illustration; however, the utility of this technique with reference to a complicated database is evident. Note that since each linked document had at least one document index term which was also in the set of option index terms, all three linked documents had a match value. However, in the event that there is no correspondence, the match value would be zero and the document absent from the list of sorted documents. It is also pointed out that since Document E is not directly linked to Document A, it is not even considered for the ranked list of documents.

Furthermore, depending on the structure of the database and the specific functions to be provided, the list may be constructed, to not only exclude documents with match values of zero as described above; but, also to exclude documents having less than a predetermined cutoff value.

Data Store 16 represents a ranked list of documents. The user can then pick from the displayed list of documents by selecting a command option on the CCDS. Thus, traversal in the database from one node to a second node is accomplished by a process of selecting, ordering, and displaying a subset of possible links from a document, resulting in reduced user confusion while browsing through the database.

This aspect of the present invention is an aid to the navigation problem in hypertext-type databases because it provides an automatic method for reducing and ordering the choice of links which may be traversed from a particular node while browsing a hypertext.

Unlike the strategy of total elision of some classes of links, typified by the webs method described in The Background of the Invention, the present invention leaves all links intact for potential use by either the user or the criterion evaluation process.

Furthermore, by restricting the operation of the criterion or query to the scope of a single node's links, the present invention largely avoids the precision/recall tradeoffs typical of information retrieval. These tradeoffs are produced as users attempt to reduce the number of items resulting from a query to a managable number. Because the present method begins with a smaller set, i.e., only those nodes linked to the currently visible node, this tradeoff is largely ameliorated.

The precise manner in which a document is selected is a matter of design or user preference. For example, an extremely expedient "tour" through the database using a specific option representing a set of option index terms may be conducted by eliminating any display of the ranked list of documents, the selection of a command resulting in automatic repositioning of the user to a position in the database which represents the document which is first on the ranked list. Or, the display of relevant documents might be limited to a specific number, for example, the first four or five documents on the ranked list. The set of criteria (options) may be predetermined by the system designer or may be created by the end user. In the second case the end user would develop his or her own option index terms, the set of option index terms being added to the set of criteria (Data Store 8).

III. Use of a Guide as the User Interface

As noted, one aspect of the invention is the use of guides as options which are represented to the user on the computer display in the form of a portrayed character or personality. The guides may be displayed to the user as a pictorial representation, with or without accompanying text, sound or video. Applicants have discovered that the use of such a character or personality can draw associations in the mind of a user that are extremely strong yet representable by a complex set of index terms. For the end user to attempt to formulate such a complex set of index terms would be extremely inefficient. Furthermore, applicants have discovered that utilization of such a guide with a hypertext-type database can provide a very powerful tool for traversing the database.

For example, consider a database consisting of documents relating to the Civil War. Use of this traversal system in combination with the hypertext-type database allows the user to be guided through the database through, for example, the viewpoint of a slave, or for example, through the viewpoint of a confederate soldier.

One of the expectations aroused by the human image is personality. Personality is a way of explaining the complex set of motivations and reasoning that any person exhibits. It allows one to form a predictive model of a person's behavior and response without knowing minutae of life experience and aspirations. Similarly, in representing a complex set of behavior patterns in the computer, as created by an information query, a human portrayal is useful when the user cannot or does not want to know the actual mechanism which is being invoked. The anthropomorphic representation engages the user's expectation of personality, i.e., a complex but predictable pattern of action. It solves the problem of complex query languages by providing a more limited repetoire of stereotypic, personality represented choices.

For the end user to create a set of option index terms which would effectively guide him through the database with the viewpoint desired would be exceedingly difficult and time consuming. However, professional text editors have the capability of providing meaningful sets of such index terms. This tool is even more powerful when utilized with a hypermedia database. Obviously, creating meaningful queries for use with a database containing electronic documents consisting of graphics or sounds is even more difficult than creating such queries for a database merely containing text.

IV. Example

As noted, the present applicants, utilizing the principles of the present invention, have created a user interface for a database composed of multimedia material. The vehicle for delivery is HYPERCARD. In this reduction to practice the hypertext-type database includes multimedia electronic documents in the period of American History from 1800 to 1850. In the implementation, options or "guides" are utilized which represent prototypical characters from the period of American History covered by the database.

Figure 5A:
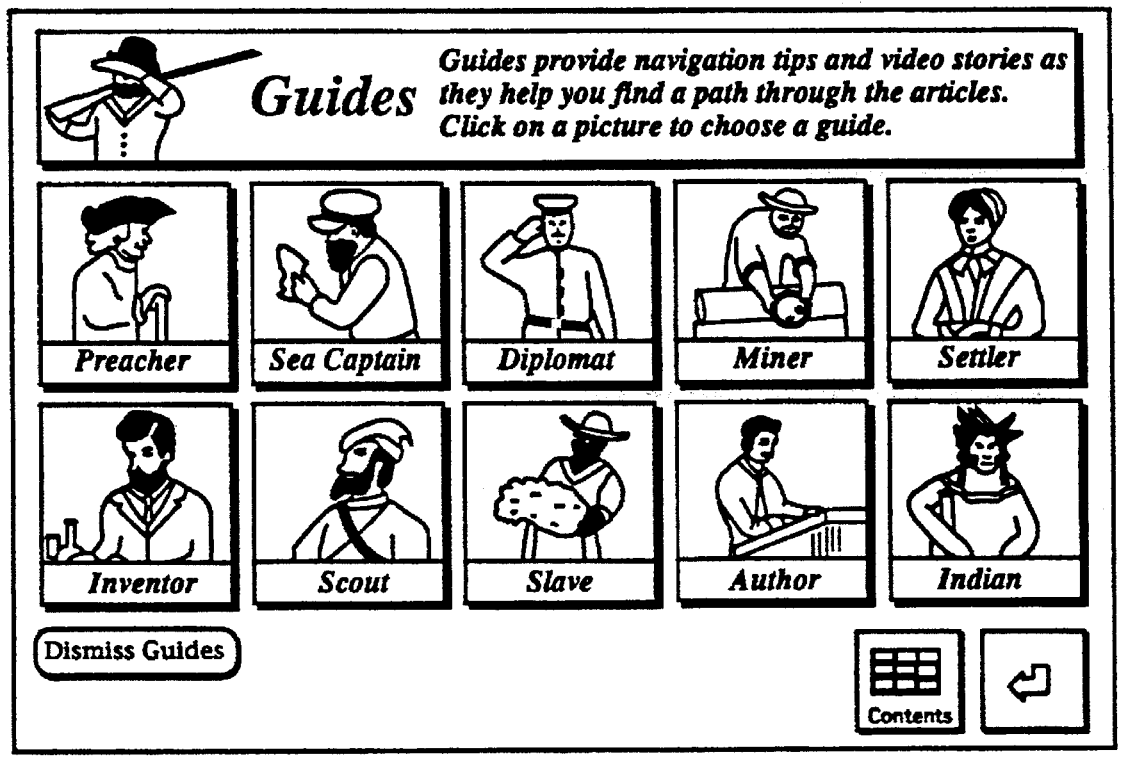

As shown in FIG. 5a, which is an actual reproduction of the computer display used in this implementation, the set of guides provided include an Indian, a settler, a minor, a sea captain, an author, a diplomat, an itinerant preacher, an inventor, a slave and a scout. A user can select one of these ten guides from the screen which depicts them. Once a guide is selected, a smaller iconic representation of that guide appears in a box at the top of the screen, confirming the user's choice.

Figure 5B:
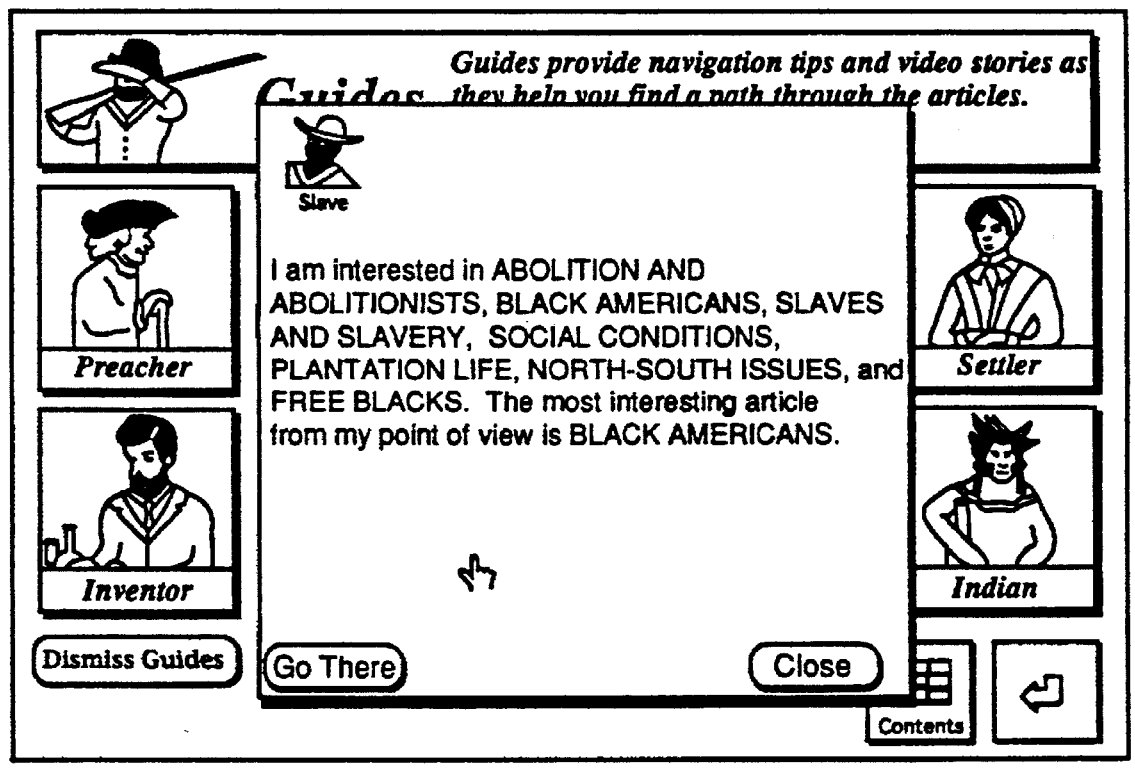

Referring now to FIG. 5b, a screen display is shown in which a slave has been selected as the guide. The option index terms characterizing that selected option are displayed, such as ABOLITION, BLACK AMERICANS, SLAVES, etc. Additionally, the guide's recommended first move, to the article entitled "Black Americans" is shown. The user can take this suggested article as a point of entry into the database. Alternatively, the user can re-enter the database anywhere with the chosen guide in tow. As the user moves through the information, the guide appears at the bottom of the screen whenever he or she can suggest a relevant next move.

Figure 5C:
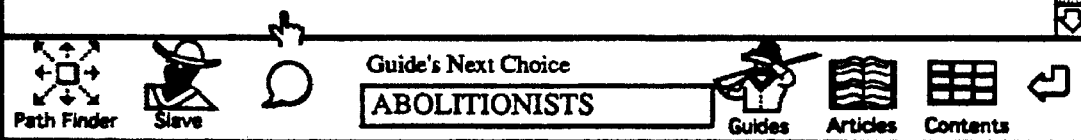

Referring now to FIG. 5C, a screen display is shown of the selected document entitled Black Americans. At this point, the user is at a specific node in the database. The representation of the slave in the display serves as a reminder that the particular guide being utilized is a slave. However, by selecting the representation "Guides" at the bottom of the screen display the user is free to choose a different guide. The screen display also shown that the guide's next first choice is the document entitled "ABOLITIONISTS".

Figure 5D:
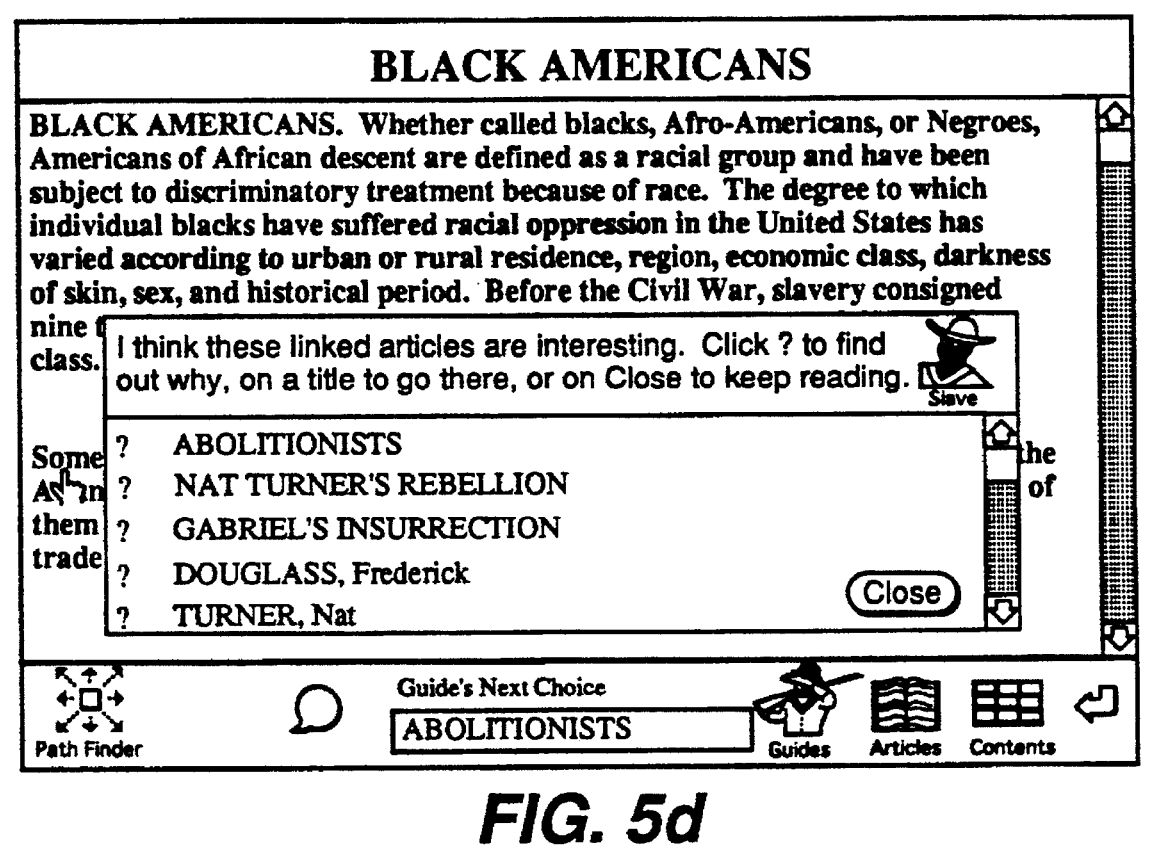

Referring now to FIG. 5d, a screen display is shown in which the user has requested not only to be provided the selection of a first choice, but in addition, he is provided a ranked list of choices. The depiction of a slave is shown in the upper right corner of the inserted window to remind the user of the selected option for which linked documents are compared to in order to determine their relative relevancy. In the particular implementation described, the aforementioned equation for computing match values was utilized. If the match value exceeded the cutoff value of 0.005 an article was included in the ranked list of articles for the specific guide.

Figure 5E:

Referring now to FIG. 5e, yet another display option is shown. This display option provides an indication as to the document index terms characterizing the present document and corresponding option index terms characterizing the selected option i.e., Slave.

Figure 5F:
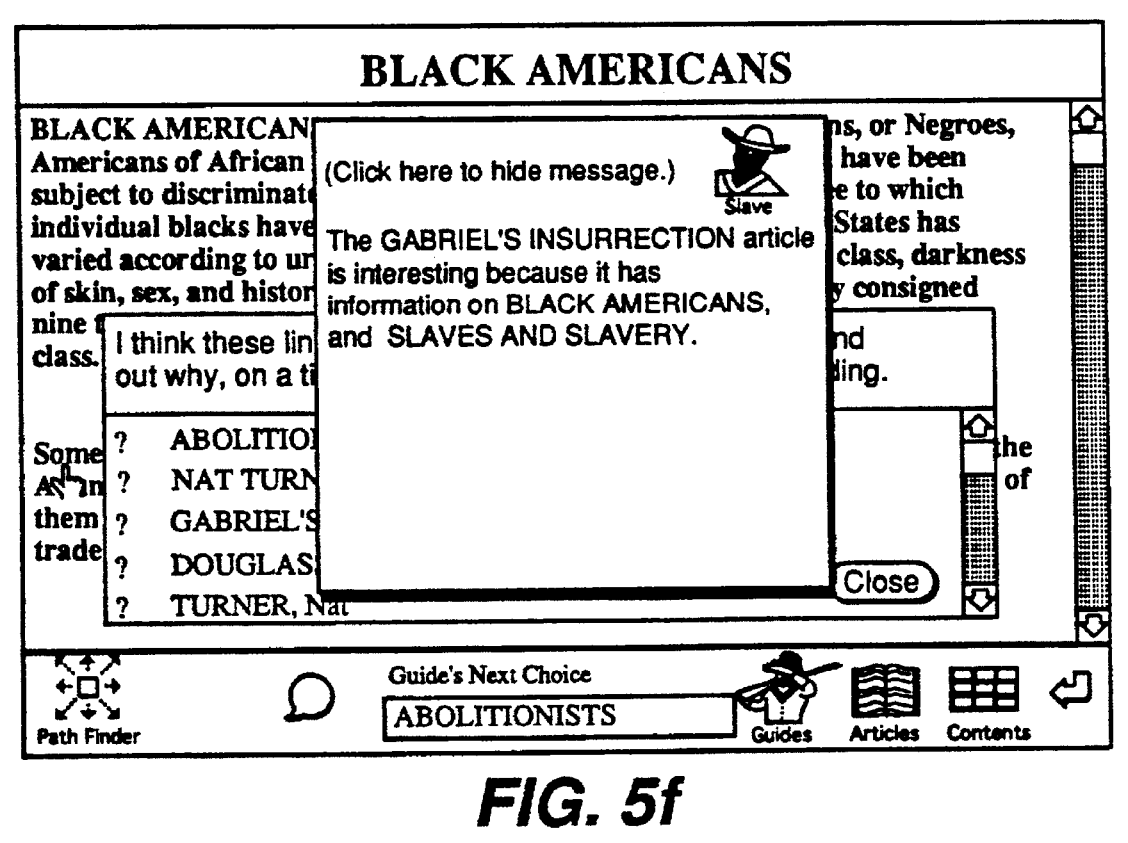

FIG. 5f shows another display illustrating a command option which provides information as to why a specific selection on the ranked list of documents would be particularly interesting in view of the selected option. Thus, the article entitled GABRIEL'S INSURRECTION is interesting because it contains index terms which correspond to option index terms characterizing the Slave.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for a user of a computer system to traverse a database to retrieve an electronic document stored in said database, said method comprising the steps of:
   a) providing a hypertext-type database, said hypertext-type database including a plurality of hypertext-type nodes, said plurality of hypertext-type nodes corresponding to a plurality of electronic documents, wherein each of said plurality of hypertext-type nodes may be selectively linked to others of said plurality of hypertext-type nodes;
   b) providing a set of descriptive index terms;
   c) indexing said hypertext-type database by assigning a unique first subset of said descriptive index terms to each electronic document of said plurality of electronic documents;
   d) receiving user input that selects a second subset of said descriptive index terms;
   e) comparing said first subset of descriptive index terms of said plurality of electronic documents with said second subset of said descriptive index terms;
   f) producing a list of electronic documents based on said comparing step e), said list of electronic documents having a first electronic document that represents a user's position within the hypertext-type database;
   g) receiving user input that selects a selected electronic document from said list of electronic documents; and
   h) changing said user's position within the hypertext-type database to correspond with said selected electronic document.

2. The method of claim 1 wherein said step of receiving user input that selects a second subset of said descriptive index terms includes the steps of:
   providing a plurality of first command options, wherein each command option of said plurality of first command options represents a second subset of said descriptive index terms; and
   receiving user input that selects a selected first command option of said plurality of first command options.

3. The method of claim 2 wherein the step of receiving user input that selects a selected electronic document includes the steps of:
   providing a plurality of second command options, wherein each command option of said plurality of second command options represents an electronic document in said list of electronic documents; and
   receiving user input that selects one of said plurality of second command options.

4. The method as recited in claim 2 wherein said step of providing a plurality of first command options is further comprised of generating, for each first command option of said plurality of first command options, a portrayed character or personality associable to the user as being biased toward a particular type of information to cause retrieval of a particular type of electronic documents.

5. A method for retrieval of documents from a database, said database comprised of a plurality of electronic documents, each of said plurality of electronic documents capable of being selectively linked with other of said electronic documents, said method comprising the steps of:
   a) defining a set of descriptive index terms for said plurality of electronic documents;
   b) indexing said database by assigning a unique first subset of descriptive index terms to each of said electronic documents;
   c) receiving input that indicates selection of a second subset of said descriptive index terms from a plurality of unique second subsets of said descriptive index terms;
   d) comparing said first subset of descriptive index terms of said electronic documents with said second subset of said descriptive index terms;
   e) generating a list of said electronic documents based on comparisons of step d), said list including a present position document;
   f) receiving input that indicates selection of a desired electronic document in said list of said electronic documents;
   g) retrieving said desired electronic document, said desired electronic document becoming the present position document.

6. The method of claim 5 wherein said step of generating the list of said electronic documents includes generating a first ranked list of said electronic documents.

7. The method of claim 6 further comprising the step of generating a second ranked list of documents which contains only documents that are selectively linked with said desired electronic document.

8. The method of claim 6 wherein said step of generating said first ranked list of said electronic documents includes assigning a plurality of match values to the electronic documents in said list of said electronic documents, wherein a match value of said plurality of match values is assigned to each document in said list of said electronic documents, said match value being a numerical indication of the relevancy of each document of said list of said electronic documents to said second subset of said descriptive index terms.

9. The method of claim 8 further comprising the step of determining each match value of said plurality of match values according to the following equation:

$$MVd = (iod)2/ioxid$$

where,
   $MVd$ = a match value of a document, d;
   $io$ = a number of descriptive index terms in said second subset of said descriptive index terms;
   $id$ = a number of descriptive index terms in said first subset of descriptive index terms assigned to said document d; and
   $iod$ = a number of descriptive index terms that are common to both said second subset of descriptive index terms and said first subset of descriptive index terms assigned to said document d.

10. A method for a user of a computer system to traverse a hypertext-type database, said hypertext-type database including a plurality of hypertext-type nodes, said plurality of hypertext-type nodes corresponding to a plurality of electronic documents, wherein said plurality of hypertext-type nodes are linked to each other by a plurality of links, said method comprising the steps of:

a) indexing said hypertext-type database by assigning to each electronic document of said plurality of electronic documents a subset of descriptive index terms from a set of descriptive index terms;

b) receiving user input that selects a selected subset of descriptive index terms of said set of descriptive index terms by performing the steps of b1) generating a plurality of subsets of descriptive index terms of said set of descriptive index terms;

b2) displaying a plurality of selectable user interface objects, wherein each of said plurality of selectable user interface objects corresponds to one of said plurality of subsets; and b3) receiving user input that selects one of said plurality of selectable user interface objects;

c) receiving user input that selects a selected electronic document of said plurality of electronic documents as a current document;

d) traversing the hypertext-type database by performing the steps of d1) generating a list of documents that contains only those documents that are directly linked to said current document through said plurality of links;

d2) generating a ranking for each document in said list of documents by comparing the subset of descriptive index terms that are assigned to each electronic document in said list of documents with said selected subset of descriptive index terms;

d3) generating a ranked list of documents based upon rankings generated in step d2;

d3) receiving input selecting an electronic document from said ranked list of documents; and d4) establishing said electronic document that was selected from said ranked list of documents as said current document.

11. The method of claim 10 wherein said step of receiving user input that selects a selected electronic document of said plurality of electronic documents includes the steps of:

generating an initial ranked list of electronic documents by comparing the subset of descriptive index terms that are assigned to each electronic document of said plurality of electronic documents with said selected subset of descriptive index terms;

receiving user input that selects said selected electronic document from said initial ranked list of electronic documents.

12. The method of claim 10 wherein the step of displaying a plurality of selectable user interface objects includes displaying a plurality of portrayed characters or personalities associable to the user as being biased toward a particular type of information.

13. The method of claim 10 wherein said step of generating a ranking for each document in the list of documents includes the step of assigning a plurality of match values to the electronic documents in said list of documents, wherein a match value of said plurality of match values is assigned to each document in said list of documents, wherein the match value of each electronic document in said list of documents is based on a number of descriptive index terms in the subset of descriptive index terms that are assigned to each electronic document in said list of documents, a number of descriptive index terms in said selected subset of descriptive index terms, and a number of index terms that are common to both the subset of descriptive index terms that are assigned to each electronic document in said list of documents and said selected subset of descriptive index terms.

14. The method of claim 13 further comprising the step of determining each match value of said plurality of match values according to the following equation:

$$MVd = (iod)^2 / io \times id$$

where,

MVd = a match value of a document, d;

io = the number of descriptive index terms in said selected subset of descriptive index terms;

id = a number of descriptive index terms in the subset of descriptive index terms assigned to said document d; and iod = the number of index terms that are common to both the subset of descriptive index terms that are assigned to document d and said selected subset of descriptive index terms.

15. A method for retrieval of documents from a database, said database comprised of a plurality of electronic documents, each of said plurality of electronic documents capable of being selectively linked with other of said electronic documents, said method comprising the steps of:

a) defining a set of descriptive index terms for said plurality of electronic documents;

b) indexing said database by assigning a first subset of descriptive index terms to each of said electronic documents;

c) generating a plurality of second subsets of descriptive index terms of said set of descriptive index terms;

d) displaying a plurality of selectable user interface objects, wherein each of said plurality of selectable user interface objects corresponds to one of said plurality of second subsets;

e) receiving user input that selects a selected user interface object of said plurality of selectable user interface objects;

f) establishing said second subset of descriptive index terms that corresponds to said selected user interface object as a selected subset of descriptive index terms;

g) comparing said first subset of descriptive index terms of said electronic documents with said selected subset of descriptive index terms;

h) generating a list of said electronic documents based on comparisons of step g);

i) receiving input that indicates selection of a desired electronic document in said list of said electronic documents; and j) retrieving said desired electronic document.

* * * * *